United States Patent [19]

Smith

[11] Patent Number: 4,948,020
[45] Date of Patent: Aug. 14, 1990

[54] BICYCLE CARRIER-SEAT COVER DEVICE

[76] Inventor: Kenneth C. Smith, 308 - 1760 Ellis Street, Kelowna, B. C. V1Y 2B4, Canada

[21] Appl. No.: 322,009

[22] Filed: Mar. 13, 1989

[30] Foreign Application Priority Data

Jul. 22, 1988 [CA] Canada .................................. 572829

[51] Int. Cl.$^5$ ............................................... B62J 7/04
[52] U.S. Cl. ..................... 224/31; 224/32 R; 224/40
[58] Field of Search ..................... 224/30 R, 31, 32 R, 224/32 A, 33 R, 39, 40

[56] References Cited

U.S. PATENT DOCUMENTS

| 585,474 | 6/1897 | Heaton | 224/33 R |
| 1,040,192 | 10/1912 | Hall | 224/39 R |
| 3,901,534 | 8/1975 | Popken | 224/31 X |
| 4,038,935 | 8/1977 | Margiloff | 116/35 R |
| 4,410,116 | 10/1983 | Mattei | 224/40 |

FOREIGN PATENT DOCUMENTS

| 38706 | 4/1928 | Denmark | 224/31 |
| 53747 | 10/1937 | Denmark | 224/31 |
| 576679 | 5/1933 | Fed. Rep. of Germany | 224/31 |
| 392521 | 11/1908 | France | 224/32 A |
| 470354 | 9/1914 | France | 224/39 R |
| 412743 | 2/1946 | Italy | 224/30 R |
| 33626 | 10/1912 | Sweden | 224/40 |
| 16112 | 7/1897 | United Kingdom | 224/33 R |
| 20590 | 9/1904 | United Kingdom | 224/40 |
| 15030 | of 1914 | United Kingdom | 224/39 R |
| 348409 | 5/1931 | United Kingdom | 224/31 |
| 415558 | 8/1934 | United Kingdom | 224/31 |

Primary Examiner—Ernest G. Cusick
Assistant Examiner—R. M. Fetsuga
Attorney, Agent, or Firm—Kolisch, Hartwell & Dickinson

[57] ABSTRACT

This invention relates to a bicycle attachment which can serve as a carrier rack, or as a back protector, or as a seat cover, when moved to various positions. A convertible bicycle carrier-seat cover apparatus which comprises: (a) an attachment adapted to be removably secured to a seat post of a bicycle; (b) a swing arm which at one end thereof is pivotally connected to the attachment, and can be pivoted through a first relatively horizontal position, a second upwardly angled position, and a third upright position in a vertical plane, and is capable of being secured in any one of the positions by a swing arm-attachment securing device; and (c) a platform secured to the end of the swing arm opposite the attachment, said platform being adapted to pivot through a vertical plane in relation to the swing arm, and being capable of being secured in a first relatively horizontal position, a second upwardly angled position, and third upright position relative to the swing arm by a platform-swing arm securing device.

7 Claims, 2 Drawing Sheets

BICYCLE CARRIER-SEAT COVER DEVICE

FIELD OF THE INVENTION

This invention relates to a bicycle attachment which can serve as a carrier rack, or as a back protector, or as a seat cover, when moved to various positions.

BACKGROUND OF THE INVENTION

In the past decade or so, there has been a dramatic increase in the number of bicycles that are in use in North America. Also, the technology relating to bicycles has developed considerably during the same time. Nowadays, there are many different types of bicycles available, such as high performance racing bikes, mountain bikes, recreation bikes, all including numerous features such as multiple gear shift mechanisms, sophisticated hand brake systems, high performance lightweight alloys, various tire constructions, and the like.

Many of the bikes in use today do not have fenders. Thus, when the bicycle travels through mud or a puddle, the rider of the bicycle becomes wet or sprayed from the mud being flung off the wheels. Also, if a bicycle is left outdoors, the seat of the bicycle can become wet from precipitation. Many bicycles are so streamlined and reduced to the bare essentials, that there is no facility for carrying a load on the bike. There are no attachments available on the market today which protect the rider from spray from the rear wheels, or protect the seat cover when the bike is not in use.

A number of patents disclose various designs of bicycle attachments. Specifically, U.S. Pat. No. 4,643,343, Goldman et al., 1987, discloses a cantilevered article carrier assembled for attachment to the underside of a bicycle seat. This device cannot be used as a seat cover.

Margiloff, U.S. Pat. No. 4,038,935, 1977, discloses a traffic signalling attachment device which is secured at one end to the bicycle post clamp and extends in a cantilevered fashion over the rear wheel. This invention is intended solely to act as a warning and turning signal for bicycles, and not as an article carrier.

U.S. Pat. No. 3,812,815, Kuenzel, 1974, discloses a resilient fluorescent safety pole that is attached to the rear of a bicycle to increase its visibility. The pole is intended to be attached to the bicycle rear axle and not to the seat post.

Hall, U.S. Pat. No. 1,040,192, 1912, discloses a book and bundle rack for bicycles. It is intended to be attached to the frame of a bicycle underneath the seat. A unique feature of the rack appears to be that, when not in use, the carrier bottom pivotally folds upwards into a collapsed position. Although the Hall bicycle rack does pivot upwards, it appears to do so simply for stowage purposes and not to be used as a splash guard, warning sign or seat cover.

SUMMARY OF THE INVENTION

A convertible bicycle carrier-seat cover apparatus which comprises: (a) attachment means adapted to be removably secured to a seat post of a bicycle; (b) swing means which at one end thereof is pivotally connected to the attachment means, and can be pivoted through a number of positions in a vertical plane, and is capable of being secured in any one of the positions by a swing means-attachment means securing device; and (c) platform means secured to the end of the swing means opposite the attachment means, said platform means being adapted to pivot through a vertical plane in relation to the swing means, and being capable of being secured in a number of positions relative to the swing means by a platform means - swing means securing device.

The swing means may be attached to the attachment means by a removable wing nut.

The platform means may be pivotally connected to the swing means by a projection oh the platform means, the projection being adapted to be secured to the swing means by a removable wing nut.

The attachment means may be secured to the seat post by a plurality of bolts and nuts.

The platform means may have formed thereon a load bearing means which rests against the swing means, when the platform means is in a lower position. The platform means, when the apparatus is in a lower position, may extend horizontally over the rear wheel of the bicycle, and the platform means, when the apparatus is in an elevated position, may extend over the top surface of the seat of the bicycle. The platform means, when in an intermediate position between the lowermost position and the uppermost position, may extend substantially vertically.

BRIEF DESCRIPTION OF THE DRAWINGS

In the drawings which depict specific embodiments of the invention, but which should not be regarded as restricting the spirit or scope of the invention in any way.

DETAILED DESCRIPTION OF SPECIFIC EMBODIMENTS OF THE INVENTION

Figure 1:
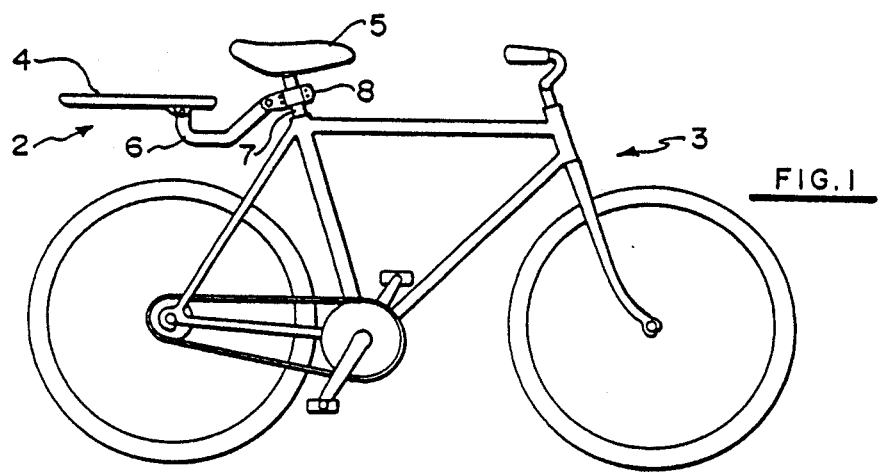
FIG. 1 depicts a side elevation view of a bicycle with the bicycle carrier-seat cover attached to the post underneath the seat of the bicycle.

Referring to the drawings, FIG. 1 illustrates a side elevation view of a bicycle 3, with the bicycle carrier-seat cover device 2 secured to the seat post underneath the seat 5. The bicycle carrier-seat cover device 2 is constructed of a carrier platform 4 which is linked to the seat post of the bicycle by means of a swing arm 6 and a seat post clamp 8.

Figure 2:
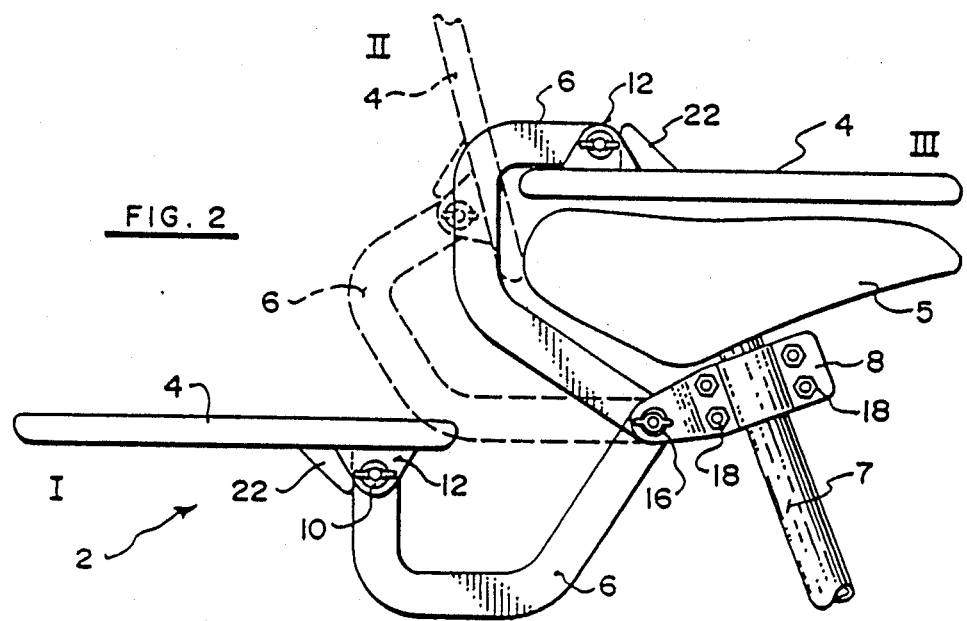
FIG. 2 depicts a side elevation view of the bicycle carrier-seat cover device moved to three positions, one as a carrier platform, the second as a back protector, and the third as a seat protector.

FIG. 2 illustrates in a detailed side elevation view, the construction of the bicycle carrierseat cover device 2. The carrier platform 4 (shown in the horizontal position serving as a carrier platform) is secured to the swing arm 6 by means of a swing arm attachment 12 that is formed on the underside of the carrier platform 4. The carrier platform 4 is secured to the swing arm attachment 12 by means of a wing nut 10. The swing arm 6, at its opposite end, is secured to seat post clamp 8 by means of a wing nut 16. The seat post clamp 8 is secured to the seat post 7 of the bicycle by means of four seat post clamp nuts 18.

FIG. 2 illustrates the bicycle carrier-seat cover device in three positions. Position I illustrates the swing arm 6 and the carrier platform 4 in the lowermost position. In this position, the carrier platform 4 serves as a platform above the rear wheel of the bicycle. A load of some sort can be secured by straps, clips, or the like, to the upper face of the carrier platform 4, when it is in this position.

In position II (shown in dotted lines in FIG. 2), the swing arm 6 is secured by wing nut 16 in an intermediate upper position, and the carrier platform 4 extends almost vertically. In this position, the platform 4 can serve as a backrest for the bicycle rider, or as splash protection for the backside of the bicycle rider. If desired, a suitable safety warning decal, or lights, can be secured to the rear face of the carrier platform 4. Then, when the bicycle is approached from the rear by an advancing automobile, or the like, the driver of the vehicle will be warned of the presence of the bicycle.

At position III, the swing arm 6 has been moved to its uppermost position and secured by wing nut 16. Likewise, the carrier platform 4 has been secured by wing nut 10 in a position where it covers the upper surface of bicycle seat 5. In the upper position, the carrier platform 4 serves as a weather protector for the top of the seat 5. Thus, the seat 5 is dry when the rider of the bicycle wishes to resume riding the bicycle.

FIG. 2 also illustrates a protruding platform rest 22, which is formed on the underside of carrier platform 4. The purpose of platform rest 22 is to add support for the wing nut 10 when the carrier platform 4 is in a load carrying position (Position I). Thus, when a load is placed on the upper surface of carrier platform 4, the load is supported not only by the two wing nuts 10 and 16, but also by platform rest 22. This prolongs the life of the wing nut 10 and the threads of the bolt connecting the wing nut 10 to the swing arm 6. Also, since the load is in part carried by platform rest 22, it is not necessary to secure wing nut 10 as tightly as would be the case if wing nut 10 carried a greater proportion of the load.

Figure 3:
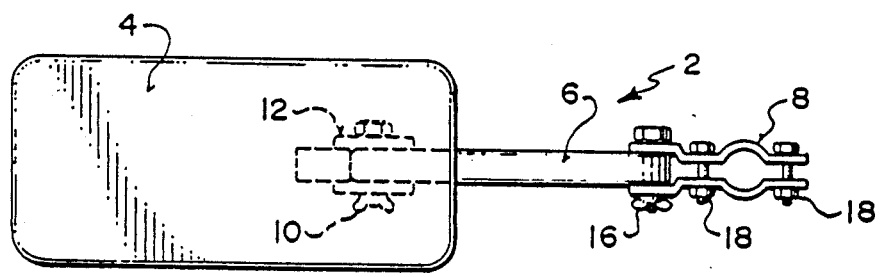
FIG. 3 depicts a top elevation view of the bicycle carrier-seat cover device.
Figure 5:
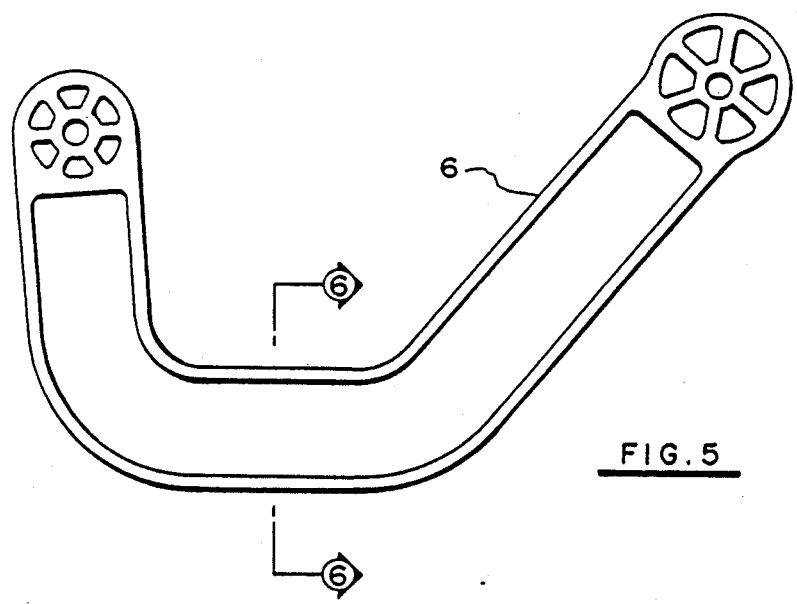
FIG. 5 depicts a detailed side elevation view of the swing arm.
Figure 4:
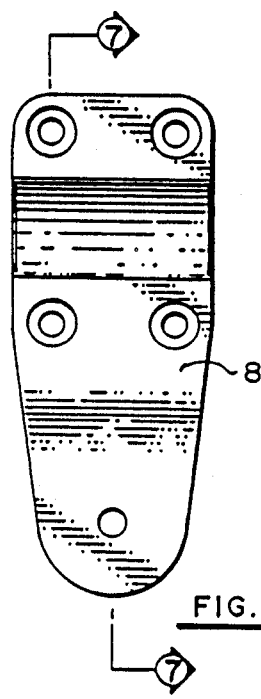
FIG. 4 depicts a detailed side elevation view of the seat post clamp.
Figure 6:
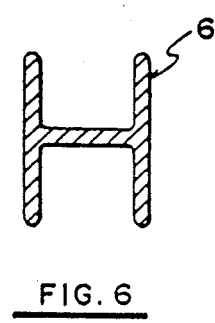
FIG. 6 depicts an end section view of the construction of the swing arm of FIG. 5, shown by cutting plane 6—6.
Figure 7:
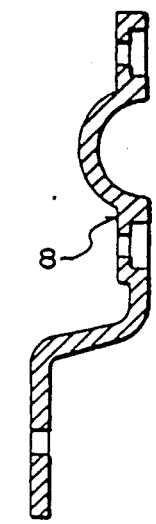
FIG. 7 depicts a top elevational sectional view of one part of the seat post clamp of FIG. 4, shown by cutting plane 7—7.

FIG. 3 illustrates a top elevation view of the bicycle carrier-seat cover device 2. The carrier platform 4 is rectangular with rounded corners. The post clamp 8 is designed to clamp securely around the cylindrical seat post.

FIGS. 4, 5, 6 and 7 illustrate further views of the construction of the bicycle carrier-seat cover device, including detailed section views of the various components thereof.

The components of the bicycle carrier-seat cover device can be formed or constructed of high strength ABS polymer, steel, aluminum or some other suitable material.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claim.

I claim:

1. A convertible bicycle carrier-seat cover apparatus for a bicycle having a seat which comprises:
    (a) attachment means adapted to be removably secured to a seat post of a bicycle;
    (b) swing means, and first connection means releasably securing said swing means at one end thereof to the attachment means in non-pivotable positions, whereby said swing means can be pivoted through a first relatively horizontal position, a second upwardly angled position, and a third upright position in a vertical plane and is adapted to be releasably secured in any one of said positions by said first connection means; and
    platform means, and second connection means releasably securing said platform means to an end of said swing means opposite the attachment means in non-pivotable positions, said platform means being adapted to pivot through the same vertical planes as the swing means, and adapted to be releasably secured in a first relatively horizontal position, a second relatively upright position relative to the swing means, and a third inverted horizontal position whereat the platform means is disposed over the bicycle seat, by said connection means.

2. An apparatus according to claim 1 wherein the swing means is attached to the attachment means by a removable wing nut.

3. An apparatus according to claim 2 wherein the platform means is pivotally connected to the swing means by a projection on the platform means, the projection being adapted to be secured to the swing means by said removable wing nut.

4. An apparatus according to claim 3 wherein the attachment means is adapted to be secured to the seat post by a plurality of bolts and nuts adapted to be inserted into the attachment means on either side of the seat post.

5. An apparatus according to claim 4 wherein the platform means has formed thereon a downwardly protruding load bearing means which rests against the swing means, when the platform means is in the first relatively horizontal position.

6. An apparatus according to claim 5 wherein the platform means, when the apparatus is in the first relatively horizontal position, is adapted to extend horizontally over the rear wheel of the bicycle, and the platform means, when the apparatus is in the third inverted horizontal position, is adapted to extend over the top surface of the seat of the bicycle.

7. An apparatus according to claim 6 wherein the platform means when in the second relatively upright position between the first relatively horizontal position and the third inverted horizontal position, may be releasably secured substantially vertically.

* * * * *